United States Patent
Naumann et al.

(10) Patent No.: US 7,490,486 B2
(45) Date of Patent: Feb. 17, 2009

(54) METHOD FOR PRODUCING BOROSILICATE GLASSES

(75) Inventors: Karin Naumann, Ober-Olm (DE); Christof Kass, Tischenreuth (DE); Franz Ott, Mitterteich (DE)

(73) Assignee: Schott AG, Mainz (DE)

( * ) Notice: Subject to any disclaimer, the term of this patent is extended or adjusted under 35 U.S.C. 154(b) by 486 days.

(21) Appl. No.: 10/480,183

(22) PCT Filed: Jun. 7, 2002

(86) PCT No.: PCT/EP02/06235

§ 371 (c)(1),
(2), (4) Date: Dec. 9, 2003

(87) PCT Pub. No.: WO02/100789

PCT Pub. Date: Dec. 19, 2002

(65) Prior Publication Data

US 2004/0176237 A1 Sep. 9, 2004

(30) Foreign Application Priority Data

Jun. 12, 2001 (EP) .................... 01114173

(51) Int. Cl.
- C03B 5/16 (2006.01)
- C03B 5/00 (2006.01)
- C03C 3/091 (2006.01)
- C03C 3/093 (2006.01)

(52) U.S. Cl. .............. 65/134.3; 65/134.1; 501/66; 501/67

(58) Field of Classification Search .............. 501/66, 501/57, 59, 67
See application file for complete search history.

(56) References Cited

U.S. PATENT DOCUMENTS

| | | | |
|---|---|---|---|
| 1,995,952 A | | 3/1935 | Taylor |
| 2,218,334 A | * | 10/1940 | Harth .......................... 501/30 |
| 2,743,553 A | * | 5/1956 | Armistead .................. 501/15 |
| 3,589,895 A | * | 6/1971 | Monks et al. .............. 65/134.3 |
| 3,985,535 A | * | 10/1976 | Bennett et al. .................. 65/61 |
| 4,792,536 A | * | 12/1988 | Pecoraro et al. ............... 501/70 |
| 4,870,034 A | * | 9/1989 | Kiefer .......................... 501/66 |
| 6,204,212 B1 | * | 3/2001 | Kunert et al. .................. 501/67 |
| 6,867,158 B2 | * | 3/2005 | Peuchert et al. ............... 501/67 |

FOREIGN PATENT DOCUMENTS

| | | | |
|---|---|---|---|
| JP | 10025132 A | * | 1/1998 |
| JP | 10324526 A | | 12/1998 |

OTHER PUBLICATIONS

Machine language translation of Naka et. al (JP 10-025132A) Accessed from PAJ website Dec. 18, 2007.*
Glastechnische Fabrikationsfehler, Edited by H. Jebsen-Marwedel and R. Brueckner, 3-D Edition, 1980, Springer-Verlag, pp. 176-195-197, 231-233.
H. Jebseb-Marwedel., et al: "Glastechnische Fabrikationsfehler", 3-D Edition., 1980, Springer-Verlag, pp. 176-181.
Heinz G. Pfaender, "Schott Guide to Glass: 2.3.3 Borosilicate Glasses" p. 25. (in English), 1996.
Heinz G. Pfaender "Schott Guide to Glass: Borosilicate Glasses for Industrial and Laboratory Use" pp. 123-129. (in English), 1996.
Joachim Lange, "Raw Materials of the Glass Industry" 3rd Revised Edition. ISBN:3-342-00663-3. 1993. Germany. (With English Translation).
H.A. Schaeffer et al: "Technology of Glass".Institute for Material Sciences 111 (Glass and Ceramics) 1985. (With English Translation).

* cited by examiner

*Primary Examiner*—Steven P. Griffin
*Assistant Examiner*—Jason L. Lazorcik
(74) *Attorney, Agent, or Firm*—Michael J. Striker

(57) ABSTRACT

The process of producing a refined borosilicate glass includes preparing a glass batch with a composition in wt. % on the basis of oxide content of $SiO_2$, 65-82; $Al_2O_3$, 2-8; $B_2O_3$, 5-13; $MgO+CaO+SrO +BaO+ZnO$, 0-7; $ZrO_2$, 0-2; and $Li_2O+Na_2O+K_2O$, 3-10; adding 0.05 wt. % to 0.6 wt. % of sulfate(s) expressed as $SO_3$ to the glass batch as the refining agent; melting the glass batch including the refining agent to form melted glass; and then hot-shaping the borosilicate glass. The refining agent may also include from 0.01 wt. % to 0.6 wt. % of $F^-$ or from 0.015 wt. % to 0.6 wt. of $Cl^-$. The sulfate is preferably an alkali metal and/or alkaline earth metal sulfate or sulfates.

14 Claims, No Drawings

METHOD FOR PRODUCING BOROSILICATE GLASSES

CROSS-REFERENCE

This is the U.S. National Stage of PCT/EP 02/06235 filed Jun. 7, 2002, which, in turn, is based on European Patent Application EP 01 114 173.6, filed on Jun. 12, 2001, in Europe.

BACKROUND OF THE INVENTION

The invention relates to a process for producing borosilicate glasses using a refining agent for batch preparation. The invention relates to a process for producing borosilicate glasses with a high chemical resistance, especially with a hydrolytic stability belonging to hydrolytic class 1.

Processes for producing glasses comprise the process steps of batch preparation, batch charging into the melting end, melting of the glass and subsequent hot-shaping of the glass. In this context, the term melting also encompasses the steps of refining, homogenization and conditioning for further processing which follow the operation of actually melting down the batch.

The term refining, with regard to melts, is understood as meaning the removal of gas bubbles from the melt. Thorough mixing and degassing of the molten batch is required in order to achieve the maximum freedom from foreign gases and bubbles. The behavior of gases and bubbles in glass melts and also the way in which they are removed are described, for example, in "Glastechnische Fabrikationsfehler", edited by H. Jebsen-Marwedel and R. Brückner, $3^{rd}$ edition, 1980, Springer-Verlag, pp. 195 ff.

The chemical refining processes are the most frequently used refining processes. The principle of chemical refining processes is for the melt or even the batch to have added to it
compounds which break down in the melt and thereby release gases, or
compounds which are volatile at relatively high temperatures, or
compounds which release gases in an equilibrium reaction at relatively high temperatures.

This increases the volume of bubbles which are present and forces them upward. The latter group of compounds includes what are known as the redox refining agents, such as for example antimony oxide, arsenic oxide. In these processes, which are by far the most common in practice, the redox refining agents used are polyvalent ions which can occur in at least two oxidation states which are in a temperature-dependent equilibrium with one another, with a gas, generally oxygen, being released at high temperatures.

The second group of compounds, namely those which are volatile at high temperatures on account of their vapor pressure, causing their action to be implemented, includes, for example, sodium chloride and various fluorides. They are collectively known as evaporation refining agents.

Redox and evaporation refining are linked to the temperatures at which the corresponding redox or evaporation (or sublimation) processes take place on account of the thermodynamic conditions. For many glass melts, such as the melts of soda-lime glasses and other relatively low-melting glasses (e.g. borate glasses, lead glasses), these options are sufficient.

However, the bubbles are more difficult to remove from glasses with melting temperatures (temperature at which the viscosity is approx. $10^2$ dpas) of between approx. 1550° C. and 1700° C., which means refining temperatures of more than 1600° C. if sufficient refining is to be achieved, on account of the increased viscosity of the glass melt. The bubbles have less tendency to grow and do not rise upward to the same extent as when the viscosities are lower. This leads to the formation of fine bubbles which can only be removed with difficulty or can no longer be removed at all by reducing the throughput or by means of higher temperatures, which makes these glasses unusable, since the resorption effect of the chemical redox refining agents, e.g. $Sb_2O_3$, i.e. the ability to reabsorb the oxygen or other gases from the fine bubbles during cooling and thereby to remove these gases, is insufficient for many high-melting glasses.

Moreover, the possibilities of increasing the temperatures for the purpose of reducing viscosity and of extending the melting and refining times, which in principle exist to a certain extent, are uneconomic. Excessively high melting temperatures would cause the refractory material of the tank furnace to be excessively attacked, leading to glass defects and to a shortening of the tank furnace service life. If the melting and refining times were to be lengthened, the melting capacity would be too low.

A further drawback of many redox refining agents and evaporation refining agents is that they are environmentally harmful or at least not environmentally friendly.

This applies, for example, to arsenic oxide and also antimony oxide. Alternative redox refining agents, for example cerium oxide, are relatively expensive replacement substances.

The abovementioned high-melting glasses with melting points of approx. 1600° C. also include the borosilicate glasses. On account of their low level of interaction with the environment, what are known as neutral glasses from the group consisting of borosilicate glasses, i.e. glasses with a high hydrolytic stability, specifically belonging to hydrolytic class 1 (DIN ISO 179), are of particular importance for many applications.

The first type of chemical refining, i.e. refining by means of compounds which decompose and thereby release gases, includes sulfate refining. This method too is known for low-melting glasses, for example for soda-lime glasses used for bottle or window glass, for example, since the $Na_2SO_4$ which is customarily used (in the case of mass-produced glasses also in the form of Glauber's salt $Na_2SO_4 \cdot 10\ H_2O$) reacts with the $SiO_2$ which is always present even at low temperatures, compared with $Na_2SO_4$, which on its own is relatively stable, in accordance with the following reaction scheme

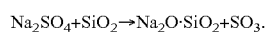
$$Na_2SO_4 + SiO_2 \rightarrow Na_2O \cdot SiO_2 + SO_3.$$

$SO_3$ reacts further to form $SO_2$ and $½ O_2$, which represent the actual refining reagents.

The purpose of the refining agent during the chemical refining process using sulfate is to remove the gases which are released during the melting process. The refining gases have to be homogeneously physically dissolved in the glass melt, known as the rough melt, at relatively low temperatures, so that it can then release the gas as bubbles at higher temperatures. The formation of gas bubbles by the refining agent is highly temperature-dependent; the temperature influences not only the viscosity of the glass melt but also the physical solubility of the gases in the glass. If the temperature rises in the refining phase, the solubility of the gases in the glass drops and bubbles are formed on account of the supersaturation at elevated temperature. The gases released in bubble form from the refining agent increase the size of the small gas bubbles which have remained from the melting process and thereby allow them to rise up so that they can be removed from the melt. However, this requires sufficient refining gas to be dissolved in the glass to then be released at the higher temperature, the refining temperature.

The solubility, i.e. in this case the $SO_2$ solubility, however, is dependent not only on the temperature but also on the basicity of the glass.

The soda-lime glasses which it is known can be successfully refined with sulfate are glasses with a high alkali metal content and a high alkaline-earth metal content. These glasses are basic on account of the high alkali metal content. They therefore have a high $SO_2$ solubility, likewise on account of the high alkali metal content.

It can be concluded from this that the higher the basicity (the alkali metal content) of the glasses, the more effective $SO_3$ becomes as a refining agent, on account of the $SO_2$ solubility.

Basic glasses have poor chemical resistances, in particular poor hydrolytic stabilities and poor acid resistances, since their high alkali metal contents can easily be dissolved out of the glass. For example, the hydrolytic stabilities of soda-lime glasses only belong to hydrolytic classes $\geq 3$ (DIN ISO 719), and their acid resistances only belong to acid classes >2 (DIN 12116).

Sulfate-refined glasses for PDP substrates are also already known. These are silicate glasses with a high alkali metal and alkaline-earth metal content with little or no boric acid and a high $Al_2O_3$ content which have high thermal expansions. The glasses, with melting points of <1600° C., are also relatively low-melting and are basic in character.

The patent literature has also already disclosed boron-containing glasses from a wide composition range which, however, according to the examples have a low $SiO_2$ content and may also contain sulfate, but only in addition to other refining agents. For example, JP 10-25132 A describes glasses to which chloride, given as up to 2% by weight of $Cl_2$, is always added in addition to $SO_3$, while JP 10-324526 A mentions glasses to which one component selected from the group consisting of $Fe_2O_3$, $Sb_2O_3$, $SnO_2$, $SO_3$ and one component selected from the group consisting of Cl, F are added in order to reduce the $As_2O_3$ content.

SUMMARY OF THE INVENTION

The invention is based on the object of providing a process for producing borosilicate glasses of high hydrolytic stability in which the glass melt is effectively refined, i.e. which results in glass with a high quality in terms of absence of bubbles, and which allows inexpensive, nontoxic refining of the glass melts, in particular glasses which melt at high temperatures.

In the process for producing borosilicate glasses belonging to hydrolytic class 1, comprising the process steps of batch preparation, melting of the glass and subsequent hot-shaping, in which context the term melting, in addition to the actual melting-down of the raw materials and cullet, also encompasses the subsequent steps of refining and homogenization, at least one refining agent, specifically between 0.01% by weight and 0.8% by weight of sulfate(s), given in the form of $SO_3$, is added to the batch. By way of example, 0.05% by weight of $SO_3$ corresponds to 0.15% by weight of $BaSO_4$. 0.6% by weight of $SO_3$ corresponds to 2.0% by weight of $BaSO_4$. It is preferable to add sulfate(s) in an amount of 0.05% by weight to 0.06% by weight of $SO_3$.

The addition of sulfate(s) initiates the formation and growth of gas bubbles in the glass melt. Even the small quantity mentioned as the lower limit results in effective refining of the borosilicate glasses with the high hydrolytic stability mentioned (hydrolytic class 1). The high hydrolytic stability is associated with a low basicity, i.e. these highly stable glasses have an acidic character.

On the basis of previous knowledge of sulfate refining, it was not predictable and was indeed altogether surprising that the refining effect is sufficiently good in the acidic, relatively high-melting borosilicate glass melts. This is all the more surprising since the solubility of $SO_2$ in acidic borosilicate glasses is very low. For example, the $SO_3$ content in borosilicate glasses is at most approx. 0.01% by weight, whereas in soda-lime glasses it is up to 0.5% by weight. The refining action occurs even without the addition of reducing agent. It is even possible for nitrates to be used as raw materials and for polyvalent compounds to be added in their oxidized form, e.g. $Fe_2O_3$, without the glass quality being adversely affected.

DESCRIPTION OF THE PREFERRED EMBODIMENTS

The sulfate may be added in the form of one or more sulfates, e.g. $MgSO_4$, $CaSO_4$, $BaSO_4$, $ZnSO_4$, $Na_2SO_4$ or other alkali metal and/or alkaline-earth metal sulfate(s); the use of $NaSO_4$, alone or with $BaSO_4$, is preferred. The sulfate used must be selected in such a way that the release of $SO_2$ and $O_2$ is matched to the viscosity of the glass melt and/or to the refining temperature of the glass. This is because as yet undecomposed sulfate must be available at the time of refining, and this sulfate then decomposes—without additional reducing agents—to form $SO_2$ and $O_2$, thereby degassing the glass. If it is released too early, the refining is not sufficient and seeds remain in the glass. The person skilled in the art will readily be able to suitably adapt the relevant tank furnace and melting parameters.

A high acid resistance is also associated with a low basicity.

Therefore, by analogy to the application of the process to glasses with a high hydrolytic stability, it is also surprising and advantageous that the process can also be applied to borosilicate glasses with a high acid resistance, i.e. belonging to acid class 1 or 2. The process also reveals its very good refining action for glasses of this type and for glasses which belong both to hydrolytic class 1 and to acid class 1 or 2.

In the process according to the invention, it is also possible for fluoride and chloride, which serve as fluxes and evaporation refining agents, to be added as well as the sulfate which is essential to the invention. For example, the glasses produced using the process may contain up to 0.5% by weight of F, preferably at least 0.0025% by weight, for preference between 0.005 and 0.4% by weight, of F. On account of the high volatility of the fluorides, these contents mean an addition of 0.005-1.0, preferably 0.01-0.6% by weight of fluoride, for example as $CaF_2$, to the batch.

The glasses may also contain up to 0.3% by weight of $Cl^-$. On account of the volatile nature of chlorides, this represents an addition of up to 0.6% by weight of $Cl^-$, for example as NaCl, to the batch. Higher levels would cause vapors to be released during further processing of the glasses, and these vapors would precipitate as an interfering coating on the surface (a phenomenon known as lamp rings). It is preferably for at least 0.015% by weight to be added to glasses. The glasses preferably contain up to 0.08% weight of $Cl^-$. Even the glasses to which no chloride is added may contain up to 100 ppm of $Cl^-$ as an impurity when standard raw materials are used. If particularly pure raw materials are used, it would be possible to reduce this level to <100 ppm.

The glass produced using the process according to the invention may also contain the following polyvalent compounds: up to 5% by weight of $Fe_2O_3$, preferably up to 2% by weight of $Fe_2O_3$, up to 1% by weight of $CeO_2$, up to 5% by weight of $MnO_2$ and up to 5% by weight of $TiO_2$.

The process according to the invention is used to produce borosilicate glasses. This term is to be understood as meaning silicate glasses containing at least 5% by weight of $B_2O_3$.

The process is used in particular to produce relatively high-melting glasses which contain at least 65% by weight, preferably at least 70% by weight, particularly preferably more than 70% by weight of $SiO_2$.

The process is used for the production of borosilicate glasses of a high hydrolytic stability and preferably also a high acid resistance, specifically belonging to hydrolytic class 1 (DIN ISO 719) and preferably to acid class 1 or 2 (DIN 12116).

Therefore, the process is preferably used to melt glasses selected from the following composition range (in % by weight, based on oxide):

$SiO_2$ 65-82, $Al_2O_3$ 2-8, $B_2O_3$ 5-13, MgO+CaO+SrO+BaO+ZnO 0-7, $ZrO_2$ 0-2, $Li_2O$+$Na_2O$+$K_2O$ 3-10.

The glasses may in each contain the above-mentioned levels of $F^-$ and/or $Cl^-$ as a result of the addition of $F^-$ and/or $Cl^-$.

The process is preferably used to produce glasses selected from the composition range (in % by weight, based on oxide):

$SiO_2$ 70-75, $Al_2O_3$ 4.5-7, $B_2O_3$ 9.5-<11.5, MgO 0-2, CaO 0.5-2, SrO 0-3, BaO 0-1, ZnO 0-2, MgO+CaO+SrO+BaO+ZnO 1-7, $ZrO_2$ 0-1, $Li_2O$ 0-1, $Na_2O$ 5-8, $K_2O$ 0-3, with $Li_2O$+$Na_2O$+$K_2O$ 5-9

The process is particularly preferably used to produce glasses selected from the following composition range (in % by weight, based on oxide):

$SiO_2$ 72-75, $Al_2O_3$ 4.5-6.5, $B_2O_3$ 9.5-<11, CaO 0.5-2, BaO 0-1, $Li_2O$ 0-1, $Na_2O$ 6-8, $K_2O$ 0-<1.5 with $Li_2O$+$Na_2O$+$K_2O$ 5-8.

The glasses are preferably produced with the addition of $F^-$.

The process is used in particular to produce glasses selected from the composition range (in % by weight, based on oxide):

SiO 75-82, $Al_2O_3$ 2-6, $B_2O_3$ 10-13, $Na_2O$ 3-5, $K_2O$ 0-1.

The glasses are preferably produced with the addition of $Cl^-$.

The process is used in particular to produce glasses belonging to the composition range (in % by weight, based on oxide):

$SiO_2$ 70-75, $B_2O_3$ 7-10, $Al_2O_3$ 3-7, $Li_2O$ 0-1, $Na_2O$ 6-8, $K_2O$ 0-3, $Li_2O$+$Na_2O$+$K_2O$ 6-10, MgO 0-1 CaO 0-2, BaO 0-4

The process is used in particular to produce glasses belonging to the composition range (in % by weight, based on oxide)

$SiO_2$ 70-76, $B_2O_3$ 5-13, $Al_2O_3$ 2-7, MgO 0-1, CaO 0-3, BaO 0-4, ZnO 0-2, MgO+CaO+BaO+ZnO 0-7, $ZrO_2$ 0-2 $Li_2O$ 0-1, $Na_2O$ 1-8, $K_2O$ 0-6, $Li_2O$+$Na_2O$+$K_2O$ 4-10

The glasses are preferably produced with the addition of $Cl^-$ and $F^-$.

The process is used in particular to produce glasses belonging to the composition range (in % by weight, based on oxide):

$SiO_2$ 72-75, $Al_2O_3$ 5-6, $B_2O_3$ 7-10, $Li_2O$ 0-1, MgO 0-1, CaO 0.3-1, BaO 0-2.5, ZnO 0-3, MgO+CaO+BaO+ZnO 0.3-5, $Li_2O$ 0-1, $Na_2O$ 5.5-7.5, $K_2O$ 0-<1.5

The process according to the invention for producing borosilicate glasses of high chemical resistance is therefore preferably used to produce neutral glasses, i.e. glasses belonging to hydrolytic class 1, glasses for primary pharmaceutical packaging materials, e.g. ampoules, vials, syringes, for producing laboratory glass, laboratory apparatus glass for chemical engineering equipment and pipelines, glasses for lamp bulbs, for bioreactors, for biomedical applications, for example for substrate glasses for cell culture tests, for producing special glasses in the form of flat glass, cubes, rods, vessels, fibers, granules, powders, for applications in chemistry, laboratory technology, electrical engineering, electronics, e.g. as a sealing glass, and in domestic engineering.

The abovementioned hot-shaping process step encompasses a very wide range of standard hot-shaping methods, such as drawing into tubes or ribbons, or floating or rolling, casting, blowing, pressing, as they are applied according to the intended use of the glass produced, flat or hollow glasses. Here too, the person skilled in the art is readily able to select a suitable glass composition according to the particular specification and to select the parameters for the hot-shaping process step accordingly.

The step of the production process according to the invention which is essential to the invention, i.e. the addition of the abovementioned quantity of sulfate, results in a very effective refining, which manifests itself in the excellent glass quality, i.e. the lack of bubbles and seeds, in the glasses produced, which is also revealed by the fact that little S can be detected using standard analytical methods in the finished glasses, i.e. the $SO_3$ content is <0.01%, meaning that the sulfate has been completely or virtually completely converted into $SO_2$+$O_2$ and has left the glass melt in the form of bubbles. This has brought about very effective degassing of the glass.

Therefore, the process according to the invention includes effective and in particular inexpensive refining in particular of the glass melts which have a high viscosity at the standard refining temperatures and are therefore difficult to refine yet can now be refined to form glasses with a high glass quality while retaining high melting capacities.

The sulfate-refined products are environmentally compatible on account of the use of the nontoxic refining agent and their ability to be landfilled is not restricted.

A further particular advantage is that the process according to the invention does not use large quantities of chloride as refining agent. This makes it possible to avoid the subsequent depositions which are caused by chloride during further processing and occur as what are known as lamp rings for example in the case of the glasses for pharmaceutical applications which have previously been refined using chloride.

It is preferable to dispense with chloride as a refining agent and for the glasses produced using the process according to the invention to be chloride-free apart from inevitable impurities.

The process according to the invention for producing borosilicate glasses, unlike the production of soda-lime glasses with sulfate refining, can be carried out without the addition of reducing agents and makes do with relatively small quantities of added sulfate.

The invention is to be explained in more detail on the basis of exemplary embodiments.

As a Comparative Example, a glass having the basic composition (in % by weight, based on oxide) of $SiO_2$ 74.0; $B_2O_3$ 10.6; $Al_2O_3$ 5.7; $Na_2O$ 8.0; CaO 1.3 was melted and refined in a melting end at 1620° C. with the addition of 0.8% by weight of chloride as NaCl.

The batch was fed continuously, by means of a charging machine, to a melting end, with the quantity supplied being controlled by means of the level of the liquid glass in the melting tank. Rough melting, refining and cooling down of the molten glass were carried out in the usual way. In a working end or a distributor and a subsequent forehearth, the glass was thermally homogenized and chemically homogenized by stirring.

These individual steps are collectively known by the term melting in the context of the description of the invention. The glass was fed via a forehearth to a Danner blowpipe and drawn as a tube. Although the glass contains few bubbles, disruptive white coatings, known as lamp rings, are formed as a result of the escape of vapors during the further processing to form ampoules and vials. The number of bubbles cannot be reduced even by lowering the melting capacity by 20%.

As Exemplary Embodiment 1, a glass of the same basic composition as the Comparative Example was produced, but 0.46% by weight of $Na_2SO_4$, corresponding to 0.26% by weight of $SO_3$, was added instead of 0.8% by weight of $Cl^-$. Otherwise, the same raw materials were used and melting was carried out with the same melting capacity. The result was a good-quality glass with a similar low level of bubbles to the Comparative Example, but unlike in the Comparative Example, this glass did not present any disruptive lamp rings during further processing.

In a further melt with sulfate refining, it was possible to increase the melting capacity and the throughput by approx. 10% compared to the Comparative Example and Exemplary Embodiment 1 without a deterioration in the bubble quality.

The glass produced using the process according to the invention is environmentally friendly, since it does not need toxic refining agents. The process produces glasses of very good quality which do not have any white deposits even after further processing. The glasses produced in accordance with the invention with sulfate refining achieve the same refining action as with sodium chloride refining. Higher melting capacities and higher throughputs are possible.

The invention claimed is:

1. A process of producing a refined borosilicate glass having a hydrolytic class 1, said process comprising the steps of:
   a) preparing a glass batch with a composition, in wt. % on the basis of oxide content, consisting of:

| | |
|---|---|
| $SiO_2$ | 65-82 |
| $Al_2O_3$ | 2-8 |
| $B_2O_3$ | 5-13 |
| $MgO + CaO + SrO + BaO + ZnO$ | 0-7 |
| $ZrO_2$ | 0-2 |
| $Li_2O + Na_2O + K_2O$ | 3-10 | b) adding a refining agent to said glass batch, said refining agent consisting of from 0.01 wt. % to 0.8 wt. % of at least one sulfate, expressed as an equivalent amount of $SO_3$, and from 0.005 wt. % to 1.0 wt. % of fluoride;
   c) melting said glass batch including the refining agent added in step b) to form melted glass; and then
   d) hot-shaping said glass.

2. The process as defined in claim 1, in which from 0.05 wt. % to 0.6 wt. % of said at least one sulfate, expressed as an equivalent amount of $SO_3$, is added to said glass batch as said refining agent.

3. The process as defined in claim 1, in which said refining agent consists of 0.01 wt. % to 0.8 wt. % of said at least one sulfate, expressed as an equivalent amount of $SO_3$, and from 0.01 wt. % to 0.6 wt. % of said fluoride.

4. The process as defined in claim 1, in which said composition of said glass batch, in wt. % on the basis of oxide content, consists of:

| | |
|---|---|
| $SiO_2$ | 75-82 |
| $Al_2O_3$ | 2-6 |
| $B_2O_3$ | 10-13 |
| $Na_2O$ | 3-5 |
| $K_2O$ | 0-1. |

5. The process as defined in claim 1, in which said composition of said glass batch, in wt. % on the basis of oxide content, consists of:

| | |
|---|---|
| $SiO_2$ | 70-75 |
| $B_2O_3$ | 7-10 |
| $Al_2O_3$ | 3-7 |
| $Li_2O$ | 0-1 |
| $Na_2O$ | 6-8 |
| $K_2O$ | 0-3 |
| $Li_2O + Na_2O + K_2O$ | 6-10 |
| $MgO$ | 0-1 |
| $CaO$ | 0-2 |
| $BaO$ | 0-4. |

6. The process as defined in claim 1, in which said composition of said glass batch, in wt. % on the basis of oxide content, consists of:

| | |
|---|---|
| $SiO_2$ | 70-76 |
| $Al_2O_3$ | 2-7 |
| $B_2O_3$ | 5-13 |
| $MgO$ | 0-1 |
| $CaO$ | 0-3 |
| $BaO$ | 0-4 |
| $ZnO$ | 0-2 |
| $MgO + CaO + BaO + ZnO$ | 0-7 |
| $ZrO_2$ | 0-2 |
| $Li_2O$ | 0-1 |
| $Na_2O$ | 1-8 |
| $K_2O$ | 0-6 |
| $Li_2O + Na_2O + K_2O$ | 4-10. |

7. The process as defined in claim 1, in which said composition of said glass batch, in wt. % on the basis of oxide content, consists of:

| | |
|---|---|
| $SiO_2$ | 72-75 |
| $Al_2O_3$ | 5-6 |
| $B_2O_3$ | 7-10 |
| $MgO$ | 0-1 |
| $CaO$ | 0.3-1 |
| $BaO$ | 0-2.5 |
| $ZnO$ | 0-3 |
| $MgO + CaO + BaO + ZnO$ | 0.3-5 |
| $Li_2O$ | 0-1 |
| $Na_2O$ | 5.5-7.5 |
| $K_2O$ | 0-<1.5 |
| $Li_2O + Na_2O + K_2O$ | 5.5-7.5. |

8. The process as defined in claim 1, in which said at least one sulfate is one or more components selected from the group consisting of $CaSO_4$, $ZnSO_4$, $MgSO_4$, $Na_2SO_4$ and $BaSO_4$.

9. The process as defined in claim 1, in which said at least one sulfate is $Na_2SO_4$.

10. The process as defined in claim 1, wherein said at least one sulfate is selected from the group consisting of alkali metal sulfates and alkaline earth metal sulfates.

11. A process of producing a refined borosilicate glass having a hydrolytic class 1, said process comprising the steps of:

a) preparing a glass batch with a compositions, in wt. % on the basis of oxide content, consisting of:

| | |
|---|---|
| SiO$_2$ | 70-75 |
| Al$_2$O$_3$ | 4.5-7 |
| B$_2$O$_3$ | 9.5-<11.5 |
| MgO | 0-2 |
| CaO | 0.5-2 |
| SrO | 0-3 |
| BaO | 0-1 |
| ZnO | 0-2 |
| MgO + CaO + SrO + BaO + ZnO | 1-7 |
| ZrO$_2$ | 0-1 |
| Li$_2$O | 0-1 |
| Na$_2$O | 5-8 |
| K$_2$O | 0-3 |
| with Li$_2$O + Na$_2$O + K$_2$O | 5-9 | b) adding a refining agent to said glass batch, said refining agent consisting of from 0.01 wt. % to 0.8 wt. % of at least one sulfate, expressed as an equivalent amount of SO$_3$, and from 0.01 wt. % to 0.6 wt. % of fluoride;
   c) melting said glass batch including the refining agent added in step b) to form melted glass; and then
   d) hot-shaping said glass.

12. The process as defined in claim 11, in which said composition of said glass batch, in wt. % on the basis of oxide content, consists of:

| | |
|---|---|
| SiO$_2$ | 72-75 |
| Al$_2$O$_3$ | 4.5-6.5 |
| B$_2$O$_3$ | 9.5-<11 |
| CaO | 0.5-2 |
| BaO | 0-1 |
| Li$_2$O | 0-1 |
| Na$_2$O | 6-8 |
| K$_2$O | 0-<1.5 |
| with Li$_2$O + Na$_2$O + K$_2$O | 5-8. |

13. The process as defined in claim 11, wherein said at least one sulfate is selected from the group consisting of alkali metal sulfates and alkaline earth metal sulfates.

14. A process of producing a refined borosilicate glass having a hydrolytic class 1, said process comprising the steps of:

a) preparing a glass batch with a composition, in wt. % on the basis of oxide content, consisting of:

| | |
|---|---|
| SiO$_2$ | 72-75 |
| Al$_2$O$_3$ | 4.5-6.5 |
| B$_2$O$_3$ | 9.5-<11.5 |
| CaO | 0.5-2 |
| BaO | 0-1 |
| Li$_2$O | 0-1 |
| Na$_2$O | 6-8 |
| K$_2$O | 0-<1.5 |
| with Li$_2$O + Na$_2$O + K$_2$O | 5-8; | b) adding a refining agent to said glass batch, said refining agent consisting of from 0.01 wt. % to 0.8 wt. % of at least one sulfate, expressed as an equivalent amount of SO$_3$, and from 0.01 wt. % to 0.6 wt. % of fluoride;
   c) melting said glass batch including the refining agent added in step b) to form melted glass; and then
   d) hot-shaping said glass;
   wherein said at least one sulfate is selected from the group consisting of alkali metal sulfates and alkaline earth metal sulfates.

* * * * *